United States Patent [19]

Ort

[11] 4,380,017

[45] Apr. 12, 1983

[54] METHOD FOR INK JET PRINTING

[75] Inventor: Donald L. Ort, Dallas, Tex.

[73] Assignee: Xerox Corporation, Stamford, Conn.

[21] Appl. No.: 192,674

[22] Filed: Oct. 1, 1980

[51] Int. Cl.³ .............................................. G01D 15/18

[52] U.S. Cl. .................................... 346/140 R; 346/75

[58] Field of Search ............................ 346/75, 140 PD

[56] References Cited

U.S. PATENT DOCUMENTS

| | | | |
|---|---|---|---|
| 3,787,884 | 1/1974 | Demer | 346/75 |
| 3,882,988 | 5/1975 | Sloan et al. | 197/66 |
| 3,935,938 | 2/1976 | Hodne | 197/114 R |
| 3,970,183 | 7/1976 | Robinson et al. | 197/1 R |
| 3,973,661 | 8/1976 | De Boo et al. | 197/1 R |
| 4,000,803 | 1/1977 | Warp et al. | 197/133 R |
| 4,034,842 | 7/1977 | Giacone | 197/82 |
| 4,074,067 | 2/1978 | Speckhard | 178/23 R |
| 4,114,750 | 7/1978 | Baeck et al. | 400/279 |
| 4,134,696 | 11/1979 | Hanakata et al. | 400/323 |
| 4,203,678 | 5/1980 | Nordstrom et al. | 400/320 |
| 4,208,137 | 6/1980 | Liu | 400/124 |

*Primary Examiner*—George H. Miller, Jr.
*Attorney, Agent, or Firm*—Richard A. Tomlin

[57] ABSTRACT

In moving carriage ink jet printers, the motion of the carriage may be imparted to droplets expressed offsetting the droplets' position on the record surface from one another where bidirectional printing is utilized. To eliminate print distortion resulting therefrom, lines are printed two at a time, each line thus being printed by the carriage moving in only one direction.

6 Claims, 7 Drawing Figures

FIG. 4
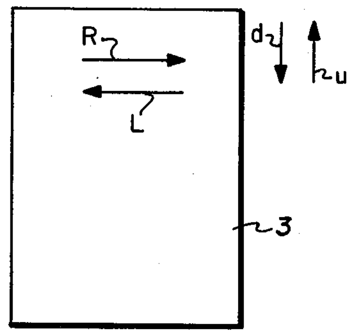
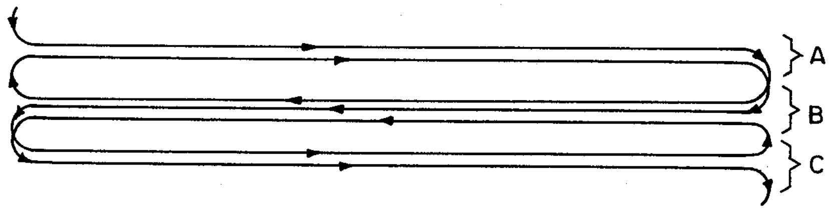
FIG. 5
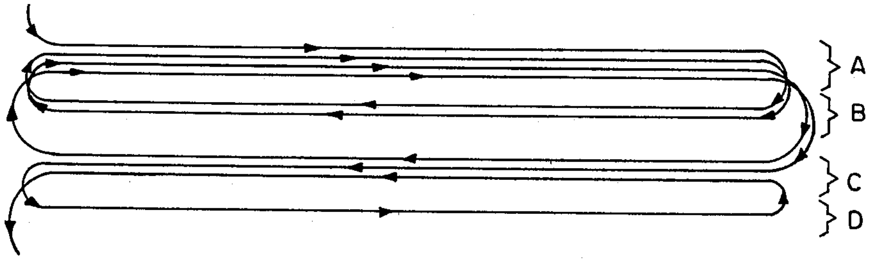
FIG. 6

METHOD FOR INK JET PRINTING

The invention relates to moving carriage ink jet printing where printing occurs while the carriage is being moved in both directions, i.e., bidirectionally. Either the carriage or the record member or both may be moved; it is the relative motion that is pertinent to this invention. The relative carriage velocity is imparted to the ink jet droplets resulting in droplet offset. This offset can become noticeable when the carriage-to-medium velocity becomes appreciable with respect to the droplet velocity. Where a single figure, such as a vertical line, is being formed by droplets expressed while the carriage is moving in both directions, this velocity offset imparted to the droplets can give the resulting character or figure a jagged appearance. This can cause a print quality problem when more than one carriage pass is needed to print a character or continuous figure. To eliminate this problem, the lines of characters are printed two at a time in such manner that each line is produced from the carriage while the carriage is moving in one direction only.

The foregoing advantages and features of the present invention will be apparent from the following more particular description of a preferred embodiment as illustrated in the accompanying drawing wherein:

FIG. 2 shows how the droplets can appear on a record surface where droplet velocity offset is not compensated for.

FIG. 4 shows the direction of movement of the record surface and the moving carriage.

FIGS. 5 and 6 show schematically other possible scanning combinations.

Figure 1A:
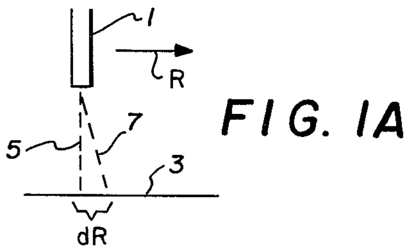
FIGS. 1A and 1B illustrate how the velocity of the moving carriage causes droplet offset on the record surface.
Figure 1B:
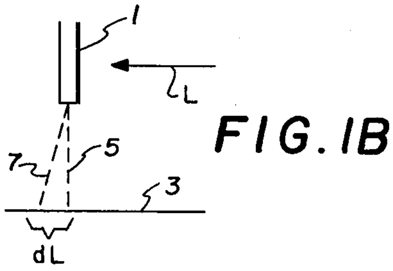

Referring to FIG. 1A, ink jet nozzle 1 is moving in the direction shown by arrow R. When a droplet is ejected from nozzle 1 in response to an electrical signal operating on a transducer, the droplet, instead of moving directly to record surface 3 along path 5, follows a trajectory represented by line 7 resulting in offset dR. Similarly, referring to FIG. 1B, which shows ink jet nozzle 1 moving in direction L resulting in offset dL. Where a single figure is produced by droplets expressed from ink jet nozzle 1 moving in both directions R and L, the resulting image will have droplets offset from each other by a distance of as much as dR plus dL.

Figure 2:
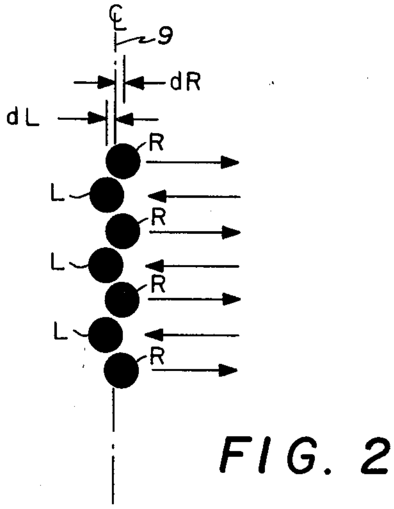

In FIG. 2 centerline 9 represents the center point of droplets where they would be if the nozzle were not being moved. That is, the droplets follow path 5 in FIGS. 1A and 1B. Dots R, however, represent the droplet positions on record surface 3 where nozzle 1 is moving in the direction R as shown in FIG. 1A when droplets are being ejected. Dots L show the position of droplets on record surface 3 resulting from the direction L movement of ink jet nozzle 1 being imparted to droplets ejected from nozzle 1. dR and dL again represent the velocity imparted droplet offset. It can be seen that where a single figure represented as a vertical line in FIG. 2 is formed by an ink jet nozzle moving in both directions that a jagged appearance can result. Of course, this velocity imparted droplet offset can be compensated for electronically by properly programming the pulse controller for ink ejection. Such systems are, however, relatively expensive and might not be economically feasible for use in inexpensive marking devices.

Figure 3:
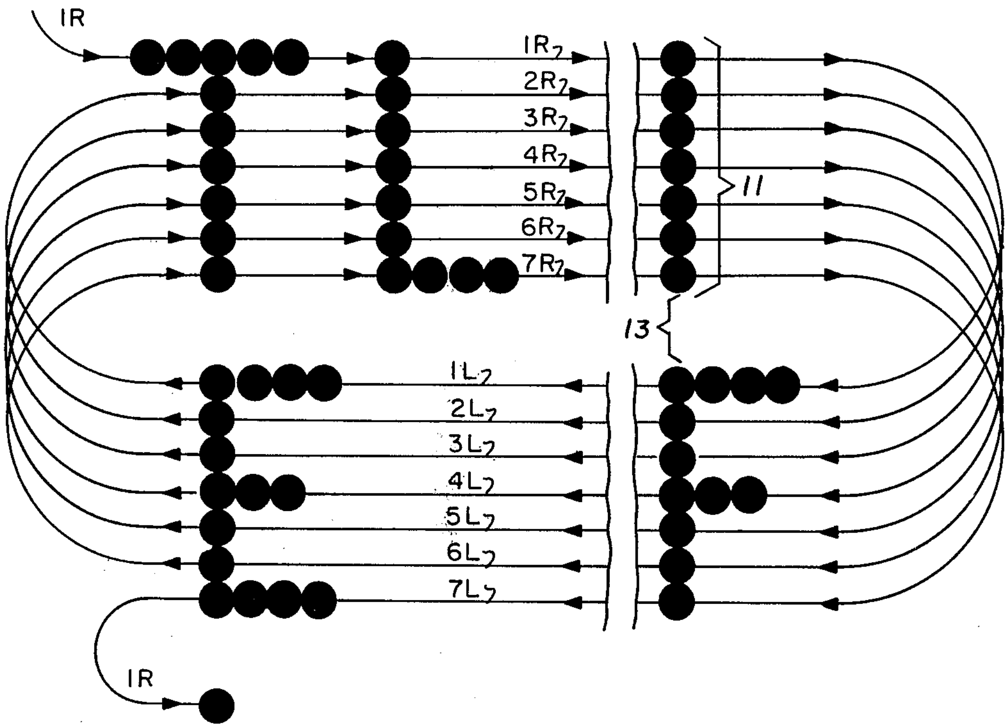
FIG. 3 shows how two lines of print are formed alternately, each being produced while the carriage is moving in only one direction.

Referring now to FIG. 3, there is shown an example of how the characters are formed in the present invention. Two lines of printing are shown; one beginning with a "T" and ending with an "I", the second beginning with an "E" and ending with an "F". The lines can be of equal length, as shown in FIG. 3, but, more commonly, will be unequal. In this specific exemplary embodiment and for purposes of explanation, it is assumed that only one ink jet nozzle 1 is being utilized. The same principle of operation obviously could apply to a multiple nozzle arrangement. The nozzle is caused to scan record surface 3 from left to right and from right to left as shown by arrows R and L in FIG. 4. As the nozzle is scanned over the predetermined lines of print on the record surface, a transducer is triggered by an electrical input to eject droplets as is well known in drop-on-demand type ink jet systems. Assume the nozzle 1 is making a first scan from left to right as shown in FIG. 3 along path 1R. When nozzle 1 finishes the scan across record surface 3 in a left to right direction, it will have completely printed the first row of the line. During turnaround of the nozzle, record surface 3 is caused to move in the direction shown as U in FIG. 4 an amount that results in the ink jet nozzle tracing path 1L as it returns from right to left. This amount of movement of record surface 3 is referred to herein as a complete line, which includes the printed line 11 and the space between lines 13. It can be seen that when nozzle 1 has completed its return trip 1L, record surface 3 must be moved in a direction d an amount equal to a complete line minus the distance of one droplet row so that nozzle 1 traces path 2R. Nozzle scanning and record surface cycling is continued in the same manner through 7L. At the end of path 7L, instead of cycling record surface 3 a distance of a complete line minus one row in a direction d, it is instead cycled in a direction U an amount of one line space, which is the distance between the bottom of one line and the top of the next line, again 1R, at which point two more lines are printed in the same manner as described above.

It can readily be seen that the same principle would apply if two or more nozzles were used except that the record surface would be moved further for each nozzle carriage pass. Also there are situations where it is desirable to make a second pass over a line of characters to, for example, darken the characters by laying a second set of droplets on the character or for interlacing or for multicolor printing. The present invention can be used for those situations as well. For example, assume seven nozzles are used spaced one droplet row apart vertically so that in a single pass a complete line is printed. Record surface 3 would then be moved a complete line in the direction U so that the next line is printed on the return pass. The record surface 3 is then moved in the direction d a complete line so that the nozzles traverse the same rows, again both left to right and right to left, after which record surface 3 is moved in a direction U a complete line so that two more lines may be printed. For carrying out the method of the present invention, apparatus such as that shown in U.S. Pat. No. 3,787,884 to F. M. Demer or U.S. Pat. No. 4,207,579 to R. L. Gamblin et al or the scanning carriage printer used in, for example, commercial Siemens ink jet printers could be utilized.

The term "line" as used herein is not necessarily restricted to be a row of alphanumeric characters. For example, one line may be interpreted to be a graph or figure. This line is then paired with another line for printing. This second line may contain a similar figure or may be rows of alphanumeric characters or a combination of both. These two lines may even be printed with an unequal number of carriage passes. They are paired together only for as long as is required to print the first line of the pair unidirectionally; then the second line of the pair becomes the first line of a new pair for as many passes as is required to finish printing that line unidirectionally. For example, in FIG. 5, the following sequence occurs:

| | |
|---|---|
| 1. Left to Right | Line A |
| 2. Right to Left | Line B |
| 3. Left to Right | Line A |
| 4. Right to Left | Line B |
| 5. Left to Right | Line C |
| 6. Right to Left | Line B |
| 7. Left to Right | Line C |

This provides two scans of lines A and C and three scans of line B.

If multiple jet nozzles are utilized, each nozzle may or may not participate in printing any particular line. One example of printing in which such jet skipping may occur is in alphanumeric printing with an array of jets that spans a vertical distance greater than at least one line of the pair. A second example is in color printing where the colors might be printed sequentially in each pair of lines, with one or more scans required for each color. Lines requiring unequal numbers of carriage passes can also be paired as needed, with a new member of a pair being selected whenever either of the two previous members has been completed. For example, in FIG. 6, line A is produced in four scans, line B in two scans, line C in three scans and line D in one scan.

The scope of this invention is not limited to printing the "lines" in sequence as they are to appear on the medium or to including the full length of a line in each scan. For example, if several pictorial figures are to be printed along with interspersed alphanumeric text, it may be desirable to pair the figures for printing first in the manner as has herein been described, then pair the text lines for printing wherever they occur. As a second example, one large pictorial figure might be divided into a "pair" for printing, with the top half of the figure becoming the first line of the pair and the bottom half, the second line.

While the apparatus and methods described herein constitute the preferred embodiment of the invention as presently contemplated by the inventor, it is to be understood that the invention is not limited to these precise forms and that changes may be made therein without departing from the scope of the invention. For example, the same technique can be applied to vertical scanning printing when the characters are positioned at a constant pitch distance. In this case, the character positions in each line are paired for printing, instead of pairing the lines as has been previously described.

What is claimed is:

1. A method of bidirectional ink jet printing, which eliminates the necessity for compensating for velocity imparted droplet offset, which comprises:

(a) moving at least one ink jet nozzle of the drop-on-demand type relative to a record receiving surface in a first direction to print a first line thereon;

(b) providing relative movement between said record receiving surface and said at least one ink jet nozzle to align said nozzle with a second line in printing relationship thereto;

(c) moving said at least one ink jet nozzle relative to said record receiving surface in a second direction, which is opposite to said first direction, to print a second line on said record receiving surface;

(d) providing relative movement between said record receiving surface and said at least one ink jet nozzle to align said at least one ink jet nozzle in printing relationship to said first line; and (e) repeating step (a) at least once, and wherein printing of said first line occurs only while said ink jet nozzle is moving in said first direction and wherein printing of said second line occurs only while said ink jet nozzle is moving in said second direction.

2. The method of claim 1 wherein after step (e) is completed, relative movement is caused between said record receiving surface and said at least one ink jet nozzle to align said at least one ink jet nozzle with a third line.

3. The method of bidirectional ink jet printing on a record receiving surface utilizing at least two sets of ink jet nozzles on a carriage, each set of ink jet nozzles including at least one ink jet nozzle, which comprises:

(a) providing relative movement between said record receiving surface and said carriage to align a predetermined set of said at least two sets of ink jet nozzles with a first line of printing in printing relationship thereto;

(b) moving said step (a) predetermined set of ink jet nozzles relative to said record receiving surface in a first direction along said first line of printing to print thereon;

(c) providing relative movement between said record receiving surface and said carriage to align a predetermined set of said at least two sets of ink jet nozzles with a second line of printing in printing relationship thereto;

(d) moving said step (c) predetermined set of ink jet nozzles relative to said record receiving surface in a second direction opposite to said first direction along said second line of printing to print thereon; and (e) repeating step (a), and wherein printing of said first line occurs only while said predetermined set of ink jet nozzles is moving in said first direction and wherein printing of said second line occurs only while said predetermined set of ink jet nozzles is moving in said second direction.

4. The method of claim 3 wherein the step (a) and the step (c) predetermined sets of ink jet nozzles are the same sets of ink jet nozzles.

5. The method of claim 3 wherein the step (a) and step (c) predetermined sets of ink jet nozzles are different sets.

6. The method of claim 3 wherein each set of said at least two sets of ink jet nozzles contains ink of a color differing from the color of ink contained in the remaining sets of ink jet nozzles.

* * * * *